United States Patent [19]

Laferle

[11] Patent Number: 5,131,711
[45] Date of Patent: Jul. 21, 1992

[54] LOCKING PINS FOR VEHICULAR SUN VISOR ASSEMBLY

[75] Inventor: Dennis M. Laferle, Shelby Township, Macomb County, Mich.

[73] Assignee: Jay White Sales and Engineering, Inc., Rochester Hills, Mich.

[21] Appl. No.: 576,204

[22] Filed: Aug. 31, 1990

[51] Int. Cl.⁵ .................................................. B60J 3/00
[52] U.S. Cl. ..................................... 276/97.1; 24/662; 24/709.6
[58] Field of Search ................. 296/97.1, 97.2, 97.12; 24/662, 704.1, 709.6

[56] References Cited

U.S. PATENT DOCUMENTS

| | | | |
|---|---|---|---|
| 3,551,963 | 1/1971 | Mosher, Jr. et al. | 24/662 X |
| 3,843,236 | 10/1974 | Kurz, Jr. | 296/97.5 X |
| 3,926,470 | 12/1975 | Marcus . | |
| 4,000,404 | 12/1976 | Marcus . | |
| 4,352,518 | 10/1982 | Prince et al. . | |
| 4,390,202 | 2/1983 | Flowerday et al. | 160/DIG. 3 X |
| 4,458,938 | 7/1984 | Viertel et al. | 5/403 X |
| 4,486,819 | 12/1984 | Marcus et al. | 362/142 |
| 4,494,789 | 1/1985 | Flowerday | 362/74 X |
| 4,570,990 | 2/1986 | Flowerday . | |
| 4,648,011 | 3/1987 | Boote et al. | 362/135 |
| 4,763,946 | 8/1988 | Robbins et al. | 296/97.1 |
| 4,768,704 | 9/1988 | Beckway et al. | 24/704.1 X |
| 4,866,579 | 2/1989 | Miller et al. | 296/97.5 X |

FOREIGN PATENT DOCUMENTS

| | | | |
|---|---|---|---|
| 2713650 | 10/1978 | Fed. Rep. of Germany | 24/704.1 |
| 2491402 | 4/1982 | France | 296/97.1 |

Primary Examiner—Dennis H. Pedder
Attorney, Agent, or Firm—Gifford, Groh, Sprinkle, Patmore and Anderson

[57] ABSTRACT

A locking mechanism for firmly holding the core members of a vehicular sun visor assembly in face to face abutment. A locking pin on one of the core members has a conical tang and flat shank forming parallel undercut surfaces. A generally tubular socket on the other core member has parallel flanges at its terminal end. The tang temporarily deforms the flanges so that the undercut surfaces of the locking pin snap past the flanges. The locking pins and sockets extend around the perimeter of the two core members.

5 Claims, 1 Drawing Sheet

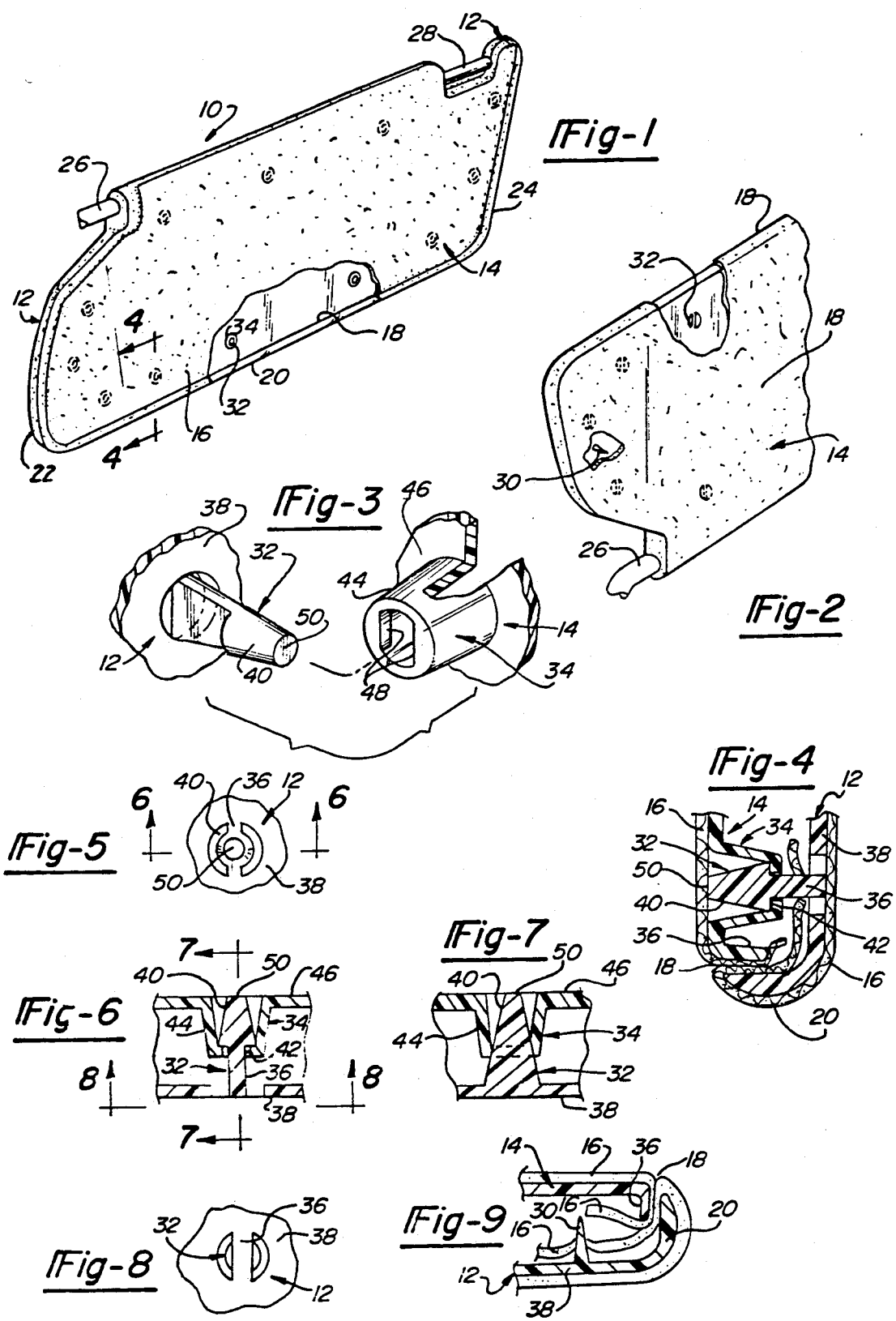

LOCKING PINS FOR VEHICULAR SUN VISOR ASSEMBLY

BACKGROUND OF THE INVENTION

1. Field of the Invention

This invention relates to vehicular sun visors, and, more particularly, this invention relates to an improved locking pin mechanism for holding visor core halves together in face to face alignment.

2.

Typically a sun visor has been constructed with a hardboard core which is covered with a plastic foam or other suitable padding material which in turn is covered with an upholstery material. The padding and upholstery material is attached to the core member by various means such as glueing, stitching, fusing, using snaps and the like. Such a hardboard core and cover is shown in U.S. Pat. No. 4,653,798.

More recently, the visor assemblies have been constructed with molded plastic core members. With a single core member, the same type of fastening techniques are used to attach the upholstery material to the single core. Such a molded single core structure is shown in U.S. Pat. No. 4,858,983.

Other molded structures are made with two halves and often are joined by a living hinge. Other two piece core structures are molded independently. In either case, the internal members are inserted into the molded core members and a covering or upholstery material is applied to the exterior of the core halves. The core halves then are pressed together and are usually bonded by a heat sealing or melting operation. In some instances, parallel wall structures are used on one of the core members to capture a single wall structure on the other core member to hold the core halves together. In some visor structures deflectable hook members are used on one of the core members with structure on the other core member to deflect the hook around and into engagement with a retaining structure. In still other visors snap fasteners have been used.

SUMMARY OF THE INVENTION

It is to an improvement in a mechanical fastening mechanism or locking device for joining the two core members together that this invention is directed. Spaced rigid pin members are located adjacent the periphery and extend inwardly from one of the core members. Each of the pins have a conical tang at its free end. Spaced sockets are located adjacent the periphery and extend inwardly from the other core member with the sockets in alignment with the pins when the core members are moved in face to face alignment. The pins are snapped into the sockets by the momentary yielding of a portion of the sockets as the tangs are pushed into the sockets, thus locking the core members together.

In the preferred form of the invention, the base core member and the cover core member are molded plastic with the pins being molded as part of the base core member and the sockets being molded as part of the cover core members.

The sockets are each defined by generally tubular boss which extends inwardly from the flat face of the core member to a free end having a flange directed towards the axis of the boss. The pins have a shank which extends inwardly from the flat face of the core member to the tang. This shank has a planar surface which defines an undercut with the tang. The undercut engages and is retained by the flange as the pin is snapped into the socket. The free end of the tang has a planar surface which is in alignment with the flat face or the exterior surface of the other core member when the pin has been snapped into the socket.

Preferably the shank has opposed parallel planar surfaces which extend inwardly from the exterior surface of the core member to define with the tang a pair of parallel undercuts. Each of the tubular bosses preferably have a pair of diametrically opposed flanges at their free end directed towards the axis of the boss to define the socket. The pins are snapped into the socket members by the momentary yielding of the flanges as the conical tangs are pushed past them so that the undercuts engage, snap over, and are retained by the flanges.

DRAWING

The preferred embodiments of the invention are illustrated in the drawing in which:

FIG. 1 is a perspective view of the sun visor assembly with a portion broken away to show the peripheral location of the locking pins with one core member snapped into the peripherally located sockets on the other core member;

FIG. 2 is a fragmentary perspective view of the visor assembly with a portion broken away to show the shank end of the pin molded integrally with the exterior surface of the flat face of one of the core members;

FIG. 3 is an exploded perspective view of the locking pin molded as part of one of the core members and the socket molded as part of the other core member showing how they will be moved for locking them together;

FIG. 4 is a fragmentary cross-sectional view of the visor assembly taken along line 4—4 of FIG. 1 showing the locking pin of one of the core members fully engaged in the socket of the other core member with the upholstery material covering the exterior surface of both of the core members being retained by cooperation of the peripheral walls of the two core members independently of the locking pin and sockets;

FIG. 5 is a fragmentary plan view showing the end of a locking pin and its integrally molded connection to the flat face of one of the core member;

FIG. 6 is a elevational cross-sectional view taken along line 6—6 of FIG. 5 showing the locking pin of one of the core members engaged in the socket of the other core member;

FIG. 7 is a partial cross-sectional view taken along line 7—7 of FIG. 6 showing the locking pin of one core member engaged in the socket of the other core member;

FIG. 8 is a fragmentary plan view showing the locking pin integrally molded with the flat face or exterior surface of one of the core members; and FIG. 9 is a fragmentary cross-sectional view similar to FIG. 4 but taken between locking pins and sockets showing a tapered or pointed pin for temporarily holding the upholstery material in place on one of the core members before the two core members are snapped together and also showing the means including the peripheral walls of the two core members for permanently holding the fabric covering both of the core members to the visor assembly.

DETAILED DESCRIPTION OF THE PREFERRED EMBODIMENTS OF THE INVENTION

Referring to FIG. 1, the sun visor assembly 10 is shown as including a pair of core member halves referred to as a base core member 12 and a cover core member 14 both of which are covered by upholstery material 16 which has been stretched around the rounded bottom wall and around the rounded sides 22 and 24 to form a retaining seam 18. The visor assembly 10 includes a pivot rod 26, partially shown in FIG. 1, and a fixed position rod 28. The visor can also contain a vanity mirror with a sliding door and lamps to provide illumination of the object to be viewed in the mirror.

Upholstery material 16 is temporarily held on the base core member and cover core member by pins 30; see FIGS. 2 and 9 respectively. Optionally, the upholstery material 16 can be temporarily held on the base core member by locking pins 32 as shown in FIG. 4 or by an adhesive. When the visor components such as pivot rod 26 have been inserted in the base core member 12 and both core halves have been covered with upholstery material, the cover core member 14 is locked to the base core member 12 by locking pins 32 on the base core member being snapped into sockets 34 on the cover core member.

When the core members have been snapped locked together the upholstery material will be retained by the coaction of the inside bottom peripheral wall 20 on the base core member and the bottom peripheral wall 36 on the cover core member which fits inside the bottom peripheral wall 20 of the base core member. Likewise, the material is permanently retained along the side walls of the visor between the inside of rounded sides 22 and 24 on the base core member and the peripheral side walls not shown, of the cover core member. The fabric or upholstery material is pinched between the bottom wall and side walls of the base core member and the bottom and side walls of the cover core member in the same manner as material is pinched between embroidery hoops. This also creates the seam 18.

Locking pins 32 have a flat shank portion 36 which projects inwardly from the flat face 38 of the base core member to a conical tang 40. The juncture of the planar shank 36 with the conical tang 40 provides parallel undercut surfaces 42.

Generally tubular bosses 40 extend inwardly from the flat face 46 of the cover core member 14 to form the sockets 34. Each of the bosses 44 have opposed and parallel, inwardly directed, flanges 48 at their terminal ends. When the pin 32 is inserted in socket 34, the conical tang 40 temporarily deforms the flanges 48 so that the undercut surfaces 42 of the locking pin 44 snap over the flanges 48 of the socket 34 to firmly lock the pin in the socket. The conical tang 40 has a flat end 50 which is coplanar or flush with the base or external surface 46 of the cover core member 14.

The embodiments of the invention in which an exclusive property or privilege is claimed are defined as follows:

1. A vehicular sun visor assembly comprising:
   a base core member;
   a cover core member; and
   means for locking said core members together in face to face alignment, said means including:
   a plurality of spaced rigid pins adjacent the periphery of one of said core members, each pin having a shank extending inwardly from said one of said core members to a frustro-conical shaped tang at the free end of the pin, and said shank having a planar surface which defines an undercut with said tang;
   a plurality of spaced sockets, defined by generally tubular bosses, adjacent the periphery and extending inwardly from the other of said core members to free ends, each having a flange with a rectilinear surface, said flange directed toward a central longitudinal axis of said boss, said sockets being in alignment with said pins when said core members are moved into face to face alignment; and
   wherein said pins are snapped into said sockets by the momentary yielding of said flanges as the tangs are pushed therein, said undercut engaging and being retained by said flange with the rectilinear surface of said flange being closely adjacent and parallel to the planar surface of said shank, locking said core members together.

2. The sun visor assembly according to claim 1 wherein said base core member and said cover core member are molded plastic and said pins are molded as part of said base core member and said sockets are molded as part of said cover core member.

3. The visor assembly according to claim 1 wherein the free end of said tang has a planar surface which is coplanar with an outer surface of the other of said core members when said pin has been snapped into said socket.

4. The visor assembly according to claim 1 wherein said tubular boss has a pair of opposed flanges with rectilinear surfaces, said flanges directed towards the axis of said boss, and said shank has a pair of parallel planar surfaces defining parallel undercuts with said tang, said undercuts engaging and being retained by said flanges with the rectilinear surfaces of said flanges being closely adjacent and parallel to the planar surfaces of said shank when the pin is snapped into the socket.

5. A vehicular sun visor assembly comprising:
   a molded plastic base core member;
   a molded plastic cover core member; and
   means for locking said core members together in face to face alignment, said means including:
   a plurality of spaced rigid pins adjacent the periphery and extending inwardly from a face of one of said core members, each of said pins having a frustro-conical shaped tang at its free end and a shank having opposed parallel planar surfaces extending inwardly from said face to said tang which define parallel undercuts with said tang;
   a plurality of spaced generally tubular bosses adjacent the periphery and extending inwardly from a face of the other of said core members, each of said bosses extending to a free end having a pair of diametrically opposed flanges with rectilinear surfaces, said flanges directed toward a central longitudinal axis of said boss defining a socket, said sockets being in alignment with said pins when said core members are moved in face to face alignment; and
   wherein said pins are snapped into said socket members by the momentary yielding of said flanges as the tangs are pushed therein with said undercuts engaging and being retained by said flanges by the rectilinear surfaces of said flanges being closely adjacent and parallel to the opposed parallel planar surfaces of said shanks.

* * * * *